United States Patent [19]

Hesse et al.

[11] Patent Number: 4,777,195

[45] Date of Patent: Oct. 11, 1988

[54] CURABLE POLYESTER MOLDING MATERIALS

[75] Inventors: Anton Hesse, Weinheim; Walter Trautmann, Neustadt; Erhard Henkes, Einhausen, all of Fed. Rep. of Germany

[73] Assignee: BASF Aktiengesellschaft, Ludwigshafen, Fed. Rep. of Germany

[21] Appl. No.: 133,734

[22] Filed: Dec. 16, 1987

[30] Foreign Application Priority Data

Dec. 17, 1986 [DE] Fed. Rep. of Germany ....... 3643007

[51] Int. Cl.$^4$ ................................................ C08K 5/16
[52] U.S. Cl. .................................... 523/461; 523/508; 524/238
[58] Field of Search ................. 523/461, 508; 524/238

[56] References Cited

U.S. PATENT DOCUMENTS 3,448,070  6/1969  Nakatsuka et al. ................. 524/238
3,879,318  4/1975  Forsyth ............................... 523/508
4,188,303  2/1980  Barge et al. ......................... 523/508

FOREIGN PATENT DOCUMENTS 61-221241  10/1986  Japan ................................. 524/238

*Primary Examiner*—Lewis T. Jacobs
*Attorney, Agent, or Firm*—Keil & Weinkauf

[57] ABSTRACT

Curable polyester molding materials contain a mixture of

A. an ethylenically unsaturated polyester or a vinyl ester possessing an unsaturated terminal group,
B. copolymerizable monomers,
C. fibrous reinforcing agents,
D. powdered fillers,
E. organic free radical initiators,
F. a viscosity depressant and
G. conventional additives.

The viscosity depressant is a tertiary or secondary amine which carries a long-chain alkyl or acyl group and a carboxyl group.

1 Claim, No Drawings

CURABLE POLYESTER MOLDING MATERIALS

The present invention relates to polyester molding materials which contain reinforcing fibers and fillers and a viscosity depressant.

Unsaturated polyester resins containing a sheetlike or pasty semifinished product of reinforcing fibers and fillers are referred to as sheet molding compounds (SMC) or bulk molding compounds (BMC). These materials are processed by hot-pressing and injection molding methods to give cured moldings, for example for automotive components or electrical articles. Their preparation and processing is described in detail in the monograph by P. F. Bruins, Unsaturated Polyester Technology, Gordon and Breach Science Publishers 1976, pages 211–238.

In order to increase the rigidity of the moldings and to improve their surface quality, it is often necessary to add relatively large amounts of fillers to the molding materials. As a consequence of this, the viscosity of the resin/filler mixtures increases to such an extent that the said mixtures no longer permit adequate impregnation of the reinforcing fibers and removal of air is hindered and the pot life reduced.

It is an object of the present invention to reduce the viscosity of resin/filler mixtures having a high filler content by means of suitable additives, to such an extent that satisfactory impregnation of the reinforcing fibers is ensured.

In order to achieve this, the addition of silanes, orthotitanates or triglycol diborates has ben proposed, but these additives do not sufficiently reduce the viscosity, or have other disadvantages.

We have found that this object is achieved by the addition of certain amino acids.

The present invention accordingly relates to curable unsaturated polyester molding materials containing a mixture of A. an ethylenically unsaturated polyester or a vinyl ester possessing a terminal unsaturated group,
B. ethylenically unsaturated monomers which are copolymerizable with A,
C. from 5 to 200% by weight, based on A+B, of fibrous reinforcing agents,
D. from 50 to 350% by weight, based on A+B, of powdered fillers,
E. from 0.1 to 4% by weight, based on A+B, of organic free radical initiators, and
F. as a viscosity depressant, from 0.1 to 6% by weight of an amino acid of the general formula

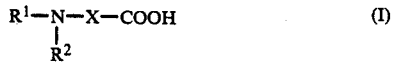

$$R^1-N-X-COOH \qquad (I)$$
$$\quad \;\; |$$
$$\quad \;\; R^2$$

where $R^1$ is hydrogen or C1–C4-alkyl, $R^2$ is a long-chain aliphatic alkyl or acyl radical of 6 to 30 carbon atoms which may be saturated or unsaturated, straight-chain or branched, and X is alkylene of 1 to 6 carbon atoms which may be straight-chain or branched, with or without G. conventional thickeners, shrinkage-reducing or elasticizing organic polymers, lubricants, inhibitors, pigments and curing accelerators.

Polyester molding materials according to the claims contain the following components:

A. Suitable ethylenically unsaturated polyesters are the conventional polycondensates of polybasic, in particular dibasic, carboxylic acids and their esterifiable derivatives, in particular anhydrides, which are bonded by ester-like bonds to polyhydric, in particular dihydric, alcohols, and may additionally contain radicals of monobasic carboxylic acids and/or of monohydric alcohols and/or of hydroxycarboxylic acids, and some or all of the radicals must possess ethylenically unsaturated copolymerizable groups.

Suitable polyhydric, in particular dihydric, unsaturated or saturated alcohols are the conventional alkanediols and oxaalkanediols, in particular those containing acyclic groups, cyclic groups or both types of groups, eg. ethy-lene glycol, 1,2-propylene glycol, propane-1,3-diol, 1,3-butylene glycol, butane-1,4-diol, hexane-1,6-diol, 2,2-dimethylpropane-1,3-diol, diethylene glycol, triethylene glycol, polyethylene glycol, dipropylene glycol, cyclohexane-1,2-diol, 2,2-bis-(hydroxycyclohexyl)-propane, trimethylolpropane monoallyl ether or butene-1,4-diol. Monohydric, trihydric or polyhydric alcohols, e.g. ethylhexa nol, benzyl alcohols, 1,2-di-allyloxypropan-3-ol, glycerol, pentaerythritol or trimethylolpropane, may also be present in minor amounts.

The polyhydric, in particular dihydric, alcohols are generally reacted in stoichiometric or virtually stoichiometric amounts with polybasic carboxylic acids or their condensable derivatives.

Suitable carboxylic acids and their derivatives are dibasic olefinically unsaturated, preferably α, β olefinically unsaturated, carboxylic acids, e.g. maleic acid, fumaric acid, chloromaleic acid, itaconic acid, methyleneglutaric acid and mesaconic acid, and their esters or, preferably, their anhydrides. The polyesters may furthermore contain, as condensed units, other dibasic, unsaturated and/or saturated or aromatic carboxylic acids which act as modifiers, for example succinic acid, glutaric acid, methylglutaric acid, adipic acid, sebacic acid, pimelic acid, phthalic anhydride, o-phthalic acid, iso-phthalic acid, terephthalic acid, dihydrophthalic acid, tetrahydrophthalic acid, tetrachlorophthalic acid, 3,6-endomethylene-1,2,3,6-tetrahydrophthalic acid or hexa-chloroendomethylenetetrahydrophthalic acid, as well as monobasic, tribasic and polybasic carboxylic acids, eg. ethylhexanoic acid, fatty acids, methacrylic acid, acrylic acid, 1,2,4,5-benzenetetracarboxylic acid or trimellitic acid.

Maleic acid and its anhydride and fumaric acid are preferably used.

Unsaturated polyesters which have been prepared using dicyclo pentadiene can also be advantageously used.

Mixed unsaturated polyesters, including those which have only limited solubility in the vinyl monomers B and readily crystallize, can likewise be used. Such readily crystallizing unsaturated polyesters can be obtained from, for example, fumaric acid, adipic acid, terephthalic acid, ethylene glycol, butane-1,4-diol, hexane-1,6-diol or neopentyl glycol.

The unsaturated polyesters have acid numbers of from 5 to 200, preferably from 20 to 85, and mean molecular weights of about 800–6,000, preferably about 1,000–4,000.

The amorphous unsaturated polyesters, which may or may not be crystallizable, are generally prepared from their starting components by melt condensation or condensation under azeotropic conditions, by a continuous or batchwise process.

Suitable terminally unsaturated vinyl ester resins for the purposes of the present invention possess the characteristic —CO—OCH$_2$CHOH—CH$_2$O— group and contain terminal polymerizable unsaturated groups. The vinyl ester resins are prepared by reacting about stoichiometric amounts of a polyepoxy resin and of an unsaturated monocarboxylic acid, for example methacrylic acid.

Vinyl ester resins of the stated type are described in, for example, U.S. Pat. No. 3,367,992, according to which dicarboxylic half esters of hydroxyacrylates or -methacrylates are reacted with polyepoxy resins. According to U.S. Pat. Nos. 3,066,112 and 3,179,623, vinyl ester resins are obtained from monocarboxylic acids, e.g. acrylic and methacrylic acid; an alternative method of preparation is also mentioned here, according to which a glycidyl methacrylate or acrylate is reacted with the sodium salt of a dihydric phenol, e.g. bisphenol A. Vinyl ester resins based on epoxy novolak resins are described in U.S. Pat. No. 3,301,743. U.S. Pat. No. 3,256,226 discloses vinyl ester resins where the molecular weight of the polyepoxide is increased, before the reaction with the acrylic acid, by reaction of 2 moles of polyepoxide with 1 mole of a dicarboxylic acid. Other suitable resins are modified vinyl ester resins, for example those described in German Laid-Open Application No. DOS 2,534,034 (equivalent to U.S. Pat. No. 3,947,422), which contain half ester groups and are obtained by reaction of the second hydroxyl group of —CO—OCH$_2$.CHOH—CH$_2$O— with a dicarboxylic anhydride, for example the anhydride of maleic acid, citraconic acid, phthalic acid, tetrabromophthalic acid, etc.

The novel curable polyester molding materials contain in general from 20 to 90, preferably from 30 to 80, by weight, based on the total weight of components A+B, of component A.

B. Suitable copolymerizable, ethylenically unsaturated monomeric compounds are the allyl and, preferably, vinyl compounds conventionally used for the preparation of unsaturated polyester molding materials, vinylaromatics, for example styrene, substituted styrenes, such as p-chlorostyrene or vinyltoluene, esters of acrylic acid and methacrylic acid with alcohols of 1 to 18 carbon atoms, such as butyl methacrylate, ethylhexyl acrylate, hydroxypropyl acrylate, β-hydroxyethyl methacrylate, dihydrodicyclopentadienyl acrylate or butanediol diacrylate, (meth)acrylamides, allyl esters, such as diallyl phthalate, and vinyl esters, such as vinyl ethylhexanoate, vinyl acetate, vinyl pro-pionate, vinyl pivalate and others. Mixtures of the stated olefinically unsaturated monomers are also suitable. Preferred components B are styrene, p-methylstyrene, chlorostyrene, vinyltoluene, divinylbenzene and diallyl phthalate. Component B is present in the polyester molding materials in general in an amount of from 5 to 80, preferably from 10 to 70, % by weight, based on the total weight of components A+B.

C. Suitable reinforcing fibers are inorganic or organic fibers in the form of rovings or sheet-like structures which may or may not be woven therefrom, such as mats, for example of glass, carbon, asbestos, cellulose and synthetic organic fibers, such as polycarboxylates, polycarbonates and nylons. Component C is present in the molding materials in amounts of from 5 to 200, preferably from 20 to 150, % by weight, based on A+B.

D. Examples of suitable fillers are conventional finely powdered or granular fillers, such as chalk, kaolin, powdered quartz, dolomite, barite, metal powders, aluminum oxide hydroxide, cement, talc and kieselguhr, and sawdust and wood chips. The fillers are used in amounts of from 50 to 350, preferably from 100 to 250, % by weight, based on components A+B.

E. Conventional organic peroxides which form free radicals at elevated temperatures are used as polymerization initiators, in amounts of from 0.1 to 4% by weight, based on A+B. Examples of suitable initiators are benzoyl peroxide, tert-butyl peroctoate, tert-butyl perbenzoate, dicumyl peroxide, di-tert-butyl peroxide and perketals, such as trimethylcyclohexanone perketal, as well as polycarbonates. Hydroperoxides are not suitable.

The peroxides should preferably have a half life of more than 5, in particular more than 50, hours at 80° C. Reactive peroxides, e.g. tert-butyl peroctoate, may additionally be present in minor amounts. CC-labile compounds and azo compounds are also suitable.

F. The viscosity depressants used according to the invention are the amino acids of the general formula I. Examples of suitable amino acids are:
3-octylaminopropionic acid
3-(2-ethylhexyl)-aminopropionic acid 3-laurylaminopropionic acid
3-palmitylaminopropionic acid
3-stearylaminopropionic acid
3-oleoylaminopropionic acid.

These amino acids can be prepared by an addition reaction of a corresponding fatty amine with acrylic acid or with an acrylate, followed by hydrolysis. A corresponding addition reaction of a fatty amine with methacrylic acid or crotonic acid or their esters may also be carried out.

Other examples of suitable amino acids are:
octylaminoacetic acid
N-methyloctylaminoacetic acid
N-(2-ethylhexyl)-aminoacetic acid
laurylaminoacetic acid
palmitylaminoacetic acid
stearylaminoacetic acid
N-methylstearylaminoacetic acid
oleoylaminoacetic acid
N-methyloleoylaminoacetic acid.

These compounds can be prepared by reacting a fatty amine with chloroacetic acid.

Other examples are:
octanoylglycine
octanoylalanine
octanoylsarcosine
octanoyl-6-aminocaproic acid
isononanoylglycine, -alanine, -sarcosine and -6-aminocaproic acid
lauroylglycine, -alanine, -sarcosine and -6-aminocaproic acid
palmitoylglycine, -alanine, -sarcosine and -6-aminocaproic acid
stearoylglycine, -alanine, -sarcosine and -6-aminocaproic acid
oleoylglycine, -alanine, -sarcosine and -6-aminocaproic acid.

These compounds are synthesized from the corresponding fatty acid chlorides and amino acids. In the case of the fatty acid chlorides, it is also possible to use mixtures, for example those obtained in the production of acid chlorides from industrial fatty acids.

The viscosity depressants are used in amounts of from 0.1 to 6, preferably from 0.2 to 4, % by weight, based on A+B.

G. Other suitable conventional additives are: shrinkage-reducing polymers, e.g. polystyrene, polymethyl methacrylate, polyvinyl acetate, polyethylene, polybutadiene, polyisoprene, cellulose esters, polyvinyl chloride and corresponding copolymers and graft copolymers, such as high impact polystyrene. They are preferably used as 30–40% strength by weight solutions in the monomers B. Polycondensates, such as saturated polyesters or polyester urethanes, which are soluble in component B and form a disperse phase when subjected to heat-curing are also suitable. The shrinkage-reducing additives are used in amounts of from 0 to 30, preferably from 3 to 20, % by weight, based on A+B. Suitable elasticizing additives, which also have a shrinkage-reducing effect, are rubber-like block copolymers, in particular those consisting of from 40 to 95% by weight of a diolefin, e.g. butadiene, isoprene or chlorophene, and from 60 to 5% by weight of a vinylaromatic, e.g. styrene or p-methylstyrene. These additives may also carry carboxyl groups.

Examples of suitable thickeners are alkaline earth metal oxides or hydroxides, such as calcium oxide, calcium hydroxide, magnesium hydroxide and, preferably, magnesium oxide, as well as mixtures of these oxides and hydroxides. These may furthermore be completely or partially replaced with zinc oxide. Polyisocyanates may also be used. The thickeners are added to the molding materials in amounts of from 0.2 to 5, preferably from 0.5 to 3, % by weight, based on A+B.

Suitable lubricants and mold release agents are zinc stearate, magnesium stearate and calcium stearate, and polyalkylene ether waxes and ammonium salts of aliphatic carboxylic acids and aliphatic amines.

Examples of other additives are inhibitors, such as hydroquinone, 2,6-dimethylhydroquinone, tert-butylas pyrocatechol, p-benzoquinone, chloranil, 2,6-dimethylquinone, nitrobenzenes, such as m-dinitrobenzene, thiodiphenylamine and salts of N-nitroso-N-cyclohexylhydroxylamine, as well as mixtures of these. The inhibitors are present in the molding materials in general in an amount of from 0.005 to 0.2, preferably from 0.01 to 0.1, % by weight, based on components A+B.

Suitable curing accelerators are, for example, octoates or naphthenates of copper, lead, calcium, magnesium and cerium and in particular of manganese and cobalt, as well as aromatic amines, such as dimethylaniline or diethylaniline.

In a preferred process for the preparation of the novel molding materials, a solution of the unsaturated polyester A in the monomers B is first prepared, this solution furthermore containing the fillers D, the free radical initiators E, the viscosity depressants F and, where relevant, the other additives G, and this liquid mixture which, because of the amino acids added according to the invention, has a sufficiently low viscosity, is used to impregnate the reinforcing fibers C, which are preferably in the form of chopped rovings up to 5 cm long. Thickening of the resin/filler mixture then occurs as a result of polymer-analogous reactions of the thickener with the terminal groups of the unsaturated polyester, the increase in viscosity being due to an increase in the molecular weight. Thickening may be carried out at room temperature, in which case it generally takes a few hours. It can be accelerated by increasing the temperature. In this case, thickening is preferably carried out at from 50° to 80° C. for up to 10 minutes. The thickening process gives nontacky semifinished products which can be stored, have sufficiently high viscosity and, depending on the type and amount of thickeners, fillers and reinforcing materials, have a leather-like or stiff consistency. Sheet-like semifinished products, ie. SMC molding materials, are formed. If, instead of mat-like reinforcing materials C, shorter fibers, for example from 1 to 5 cm long, are used and thickeners are substantially dispensed with, pasty BMC molding materials are obtained. Both types of molding materials can be processed to moldings in steel molds under from 0.4 to 15 N.mm$^{-2}$ at from 80° to 180° C., preferably from 120° to 160° C. For example, it is possible to produce bodywork components, such as engine hoods, tailgates and sliding roofs or bumpers, in the automotive sector, cable distributor boxes in the electrical sector or chairs, heater housings or shells in the furniture sector. Compared with metals, such products have a lower weight, a high strength-to-weight ratio, good corrosion resistance and flexibility in the design of the components.

In the Examples, parts and percentages are by weight.

Preparation of the polyester resin solutions

Resin 1: An unsaturated polyester having an acid number of 28 was prepared by reacting maleic anhydride and pro- pane-1,2-diol in a molar ratio of 1:1.1. The product was dissolved in styrene to give a 65% strength solution and was stabilized with 200 ppm of hydroquinone. Resin 2: An unsaturated polyester having an acid number of 30 was prepared by reacting maleic anhydride, o-phthalic anhydride, propane-1,2-diol and dipropylene glycol in a molar ratio of 1:0.18:1.04:0.23. The product was dissolved in styrene to give a 67% strength solution and was stabilized with 130 ppm of hydroquinone.

Preparation of the polymer solution

Polyvinyl acetate was dissolved in styrene at 50° C. to give a 35% strength solution and was stabilized with 100 ppm of hydroquinone and 800 ppm of p-benzoquinone. The solution had a viscosity of 2,000 mPa.s (at 23° C.).

EXAMPLE 1

To test the effectiveness of the novel viscosity depressants, the following mixtures were prepared and the viscosity determined using a Brockfield viscometer (HBT 5X):
60 parts of resin 1
40 parts of polymer solution
3 parts or 1 part of various amino acids F
200 parts of chalk (Millicarb ®).

For this purpose, the resin, polymer solution and amino acid were first homogenized and the filler was stirred in. After the mixture had been stored for 1 hour at room temperature, the viscosity was measured at 24° C.:

| Viscosity depressant | Parts | Viscosity mPa.s |
|---|---|---|
| — | — | 210,000 |
| Oleoylsarcosine | 3 | 82,600 |
| 3-oleoylaminopropionic acid | 3 | 84,000 |
| Oleoylglycine | 3 | 89,600 |
| Oleoylalanine | 3 | 137,600 |

| Viscosity depressant | Parts | Viscosity mPa.s |
| --- | --- | --- |
| Oleoylaminocaproic acid | 3 | 110,400 |

EXAMPLE 2

To test the novel additives as a function of their concentration, various amounts of oleoylsarcosine were added to mixtures of the resin 2 (100 parts) and chalk filler (200 parts), and the viscosity of the resin pastes was measured:

| % oleoylsarcosine | Viscosity mPa.s |
| --- | --- |
| 0 | 102,400 |
| 1 | 82,400 |
| 2 | 59,200 |
| 3 | 53,600 |

EXAMPLE 3

The following mixture was prepared using a high-speed stirrer:
40.5 parts of resin 1
27.0 parts of polymer solution
2.0 parts of oleoylsarcosine
2.9 parts of styrene
1.0 part of tert-butyl perbenzoate
135.0 parts of chalk
2.7 parts of zinc stearate
2.0 parts of magnesium hydroxide paste (Marinco ® H paste).

On a prepreg unit, chopped glass rovings (2.6 cm long) between polyethylene films impregnated with the mixture and then stored for 6 days at room temperature. After the cover films had been removed, the impregnated material could be pressed in a steel mold (43×50 cm) to give a 2.5 mm thick molding (at 60 bar and at 145° C. for 3 minutes). The molding had a smooth, glossy surface in which no voids were detectable. The glass fiber content was 27%.

When an attempt was made to dispense with the addition of oleoylsarcosine, the result was a highly viscous mixture with which it was impossible to achieve satisfactory impregnation of glass fibers.

EXAMPLE 4

The following mixture was prepared a a high-speed stirrer:
2,500 parts of resin 2
125 parts of styrene
0.6 part of p-benzoquinone
200 parts of polyethylene powder (as a lubricant)
75 parts of oleoylaminopropionic acid
38 parts of magnesium oxide
38 parts of tert-butyl perbenzoate
120 parts of zinc stearate
1,500 parts of chalk (HYDROCARB ®)
2,250 parts of chalk (OMYA ® BLR 3).

This mixture was used to impregnate chopped rovings (2.6 cm long) between polyethylene films on a prepreg unit. After storage for 5 days at room temperature, the cover films were removed and the semifinished product was pressed in a disk-like steel mold for 3 minutes at 145° C. The cured molding had a good, void-free and crackfree surface. The glass fiber content was 27%.

We claim:

1. A curable unsaturated polyester molding material containing a mixture of
    A. an ethyLenically unsaturated polyester or a vinyl ester resin possessing an unsaturated terminal group,
    B. ethylenically unsaturated monomers which are copolymerizable with A,
    C. from 5 to 200% by weight, based on A+B, of fibrous reinforcing agents,
    D. from 50 to 350% by weight, based on A+B, of powdered fillers,
    E. from 0.1 to 4% by weight, based on A+B, of organic free radical initiators, and
    F. from 0.1 to 6% by weight, based on A+B, of a viscosity depressant, and optionally with
    G. conventional thickeners, shrinkage-reducing or elasticizing organic polymers, lubricants, inhibitors, pigments and curing acelerators,
wherein the visocisty depressant F is an amino acid of the formula

where $R^1$ is hydrogen or $C_1$-$C_4$-alkyl, $R^2$ is a long-chain aliphatic alkyl or acyl radical of 6 to 30 carbon atoms which may be saturated or unsaturated, straight-chain or branched, and X is alkylene of 1 to 6 carbon atoms which may be straight-chain or branched.

* * * * *